United States Patent
DSouza

(10) Patent No.: US 6,894,728 B2
(45) Date of Patent: May 17, 2005

(54) METHOD FOR EQUALIZING A VSB HIGH DEFINITION TELEVISION SIGNAL IN THE PRESENCE OF CO-CHANNEL INTERFERENCE

(75) Inventor: Adolf DSouza, Westfield, IN (US)

(73) Assignee: Thomas Licensing S.A., Boulogne-Billancourt (FR)

( * ) Notice: Subject to any disclaimer, the term of this patent is extended or adjusted under 35 U.S.C. 154(b) by 556 days.

(21) Appl. No.: 10/103,055

(22) Filed: Mar. 20, 2002

(65) Prior Publication Data

US 2003/0001974 A1 Jan. 2, 2003

Related U.S. Application Data

(60) Provisional application No. 60/284,279, filed on Apr. 16, 2001.

(51) Int. Cl.[7] .................................................. H04N 5/21
(52) U.S. Cl. ........................ 348/614; 348/624; 348/607
(58) Field of Search ................................. 348/607, 611, 348/614, 624, 914, 608, 609, 612, 21; 375/232, 233, 231, 346, 348, 350; H04N 5/21

(56) References Cited

U.S. PATENT DOCUMENTS

| | | | |
|---|---|---|---|
| 5,648,822 A | | 7/1997 | Hulyalkar .................... 348/607 |
| 5,654,765 A | * | 8/1997 | Kim ............................. 348/614 |
| 6,122,015 A | * | 9/2000 | Al-Dhahir et al. ........... 348/614 |
| 6,680,971 B1 | * | 1/2004 | Tazebay et al. ............. 375/233 |

FOREIGN PATENT DOCUMENTS

WO        WO99/67946        12/1999        ............ H04N/5/21

OTHER PUBLICATIONS

Monisha Ghosh, entitled "Blind Decision Feedback Equalization for Terrestrial Television Receivers," pp. 2070–2081, Proceedings of the IEEE, vol. 86, No. 10, Oct. 1998.

EPO Search Report.

* cited by examiner

*Primary Examiner*—Sherrie Hsia
(74) *Attorney, Agent, or Firm*—Joseph S. Tripoli; Joseph J. Laks; Ronald H. Kurdyla

(57) ABSTRACT

A method and apparatus for equalizing a signal containing high definition television information in the presence of co-channel NTSC interference employs an equalizer having feed forward and decision feedback filters. A comb filter is inserted ahead of the equalizer when NTSC co-channel interference is present. A selected tap of the decision feedback filter is set to a zero value when the signal is being equalized during an intitial blind operating mode. The decision feedback filter taps are updated afterwards, in a decision-directed operating mode.

13 Claims, 20 Drawing Sheets

D = 1 symbol delay dfe(12) = 12$^{th}$ tap from input to the DFE

FIG. 3c
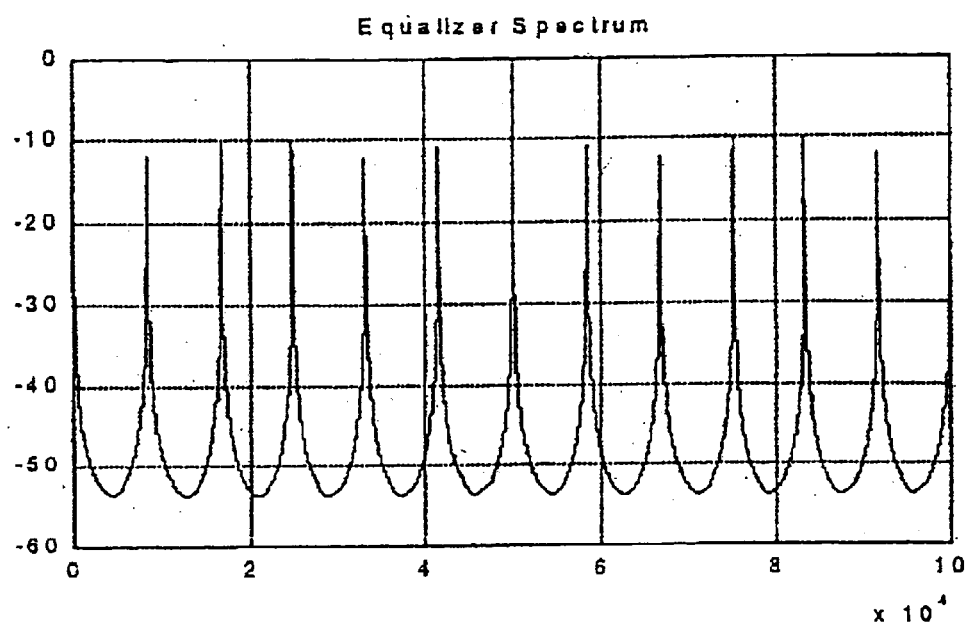
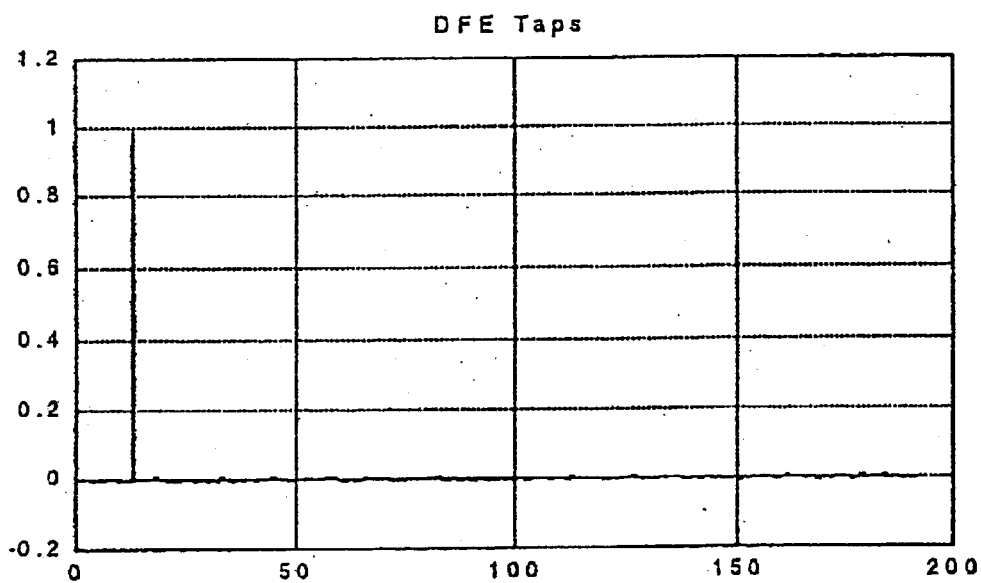
FIG. 3d

FIG. 4c
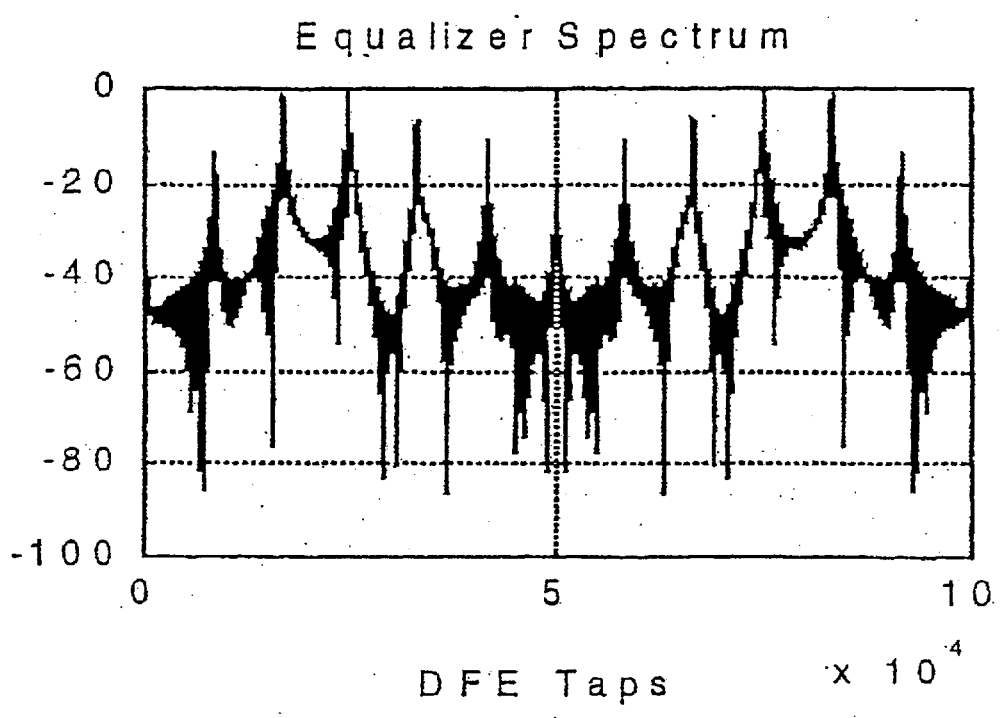
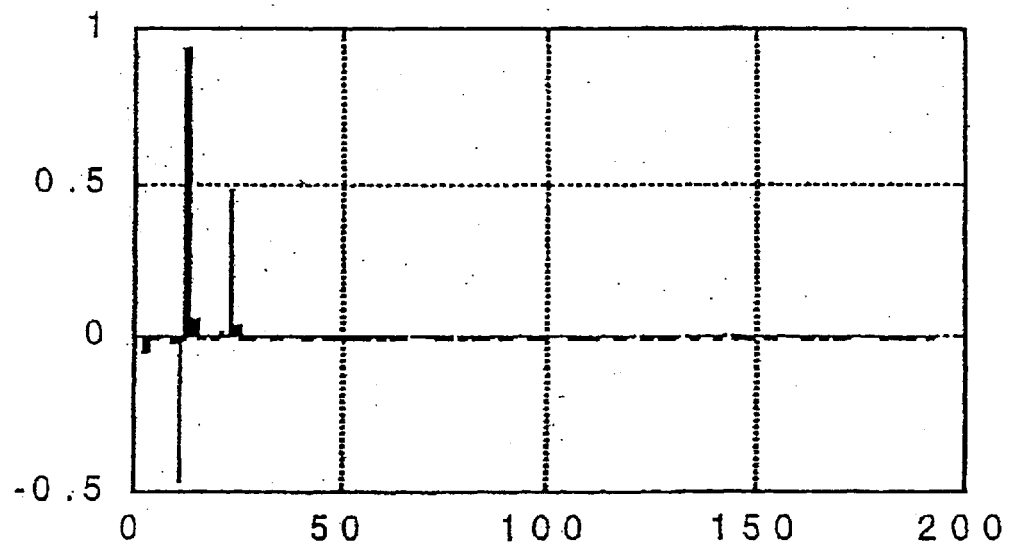
FIG. 4d

Figure 6a
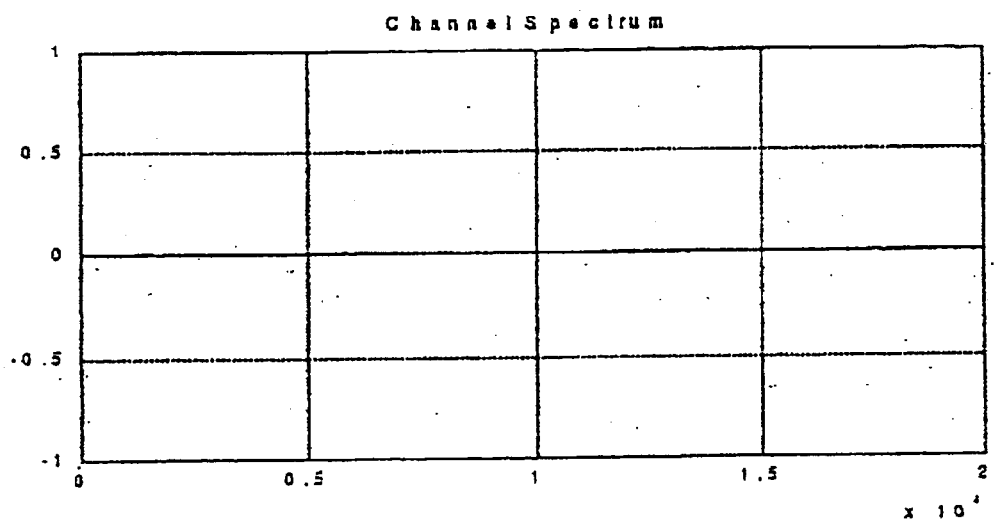
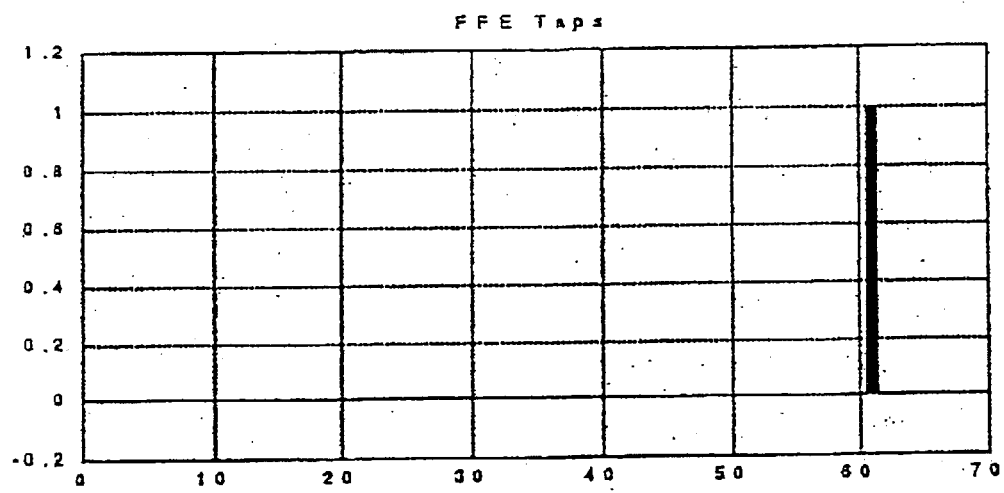
Figure 6b

FIG. 6c
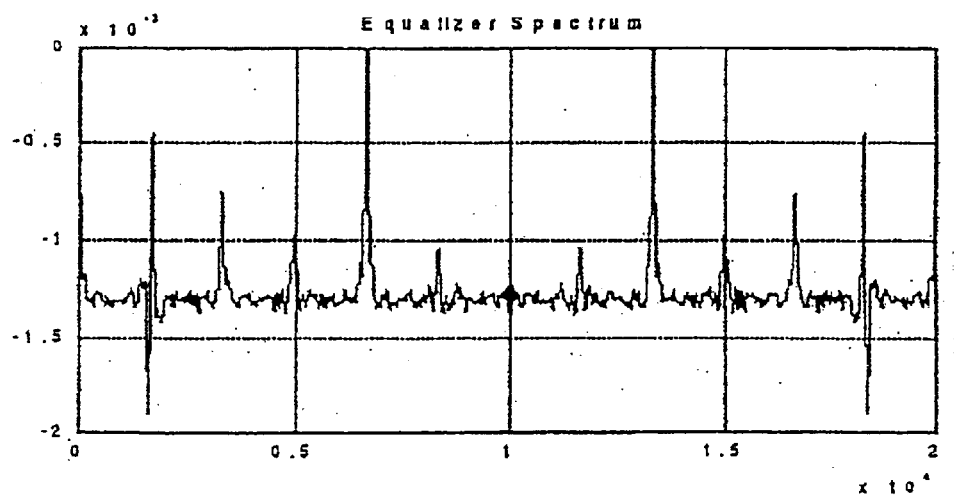
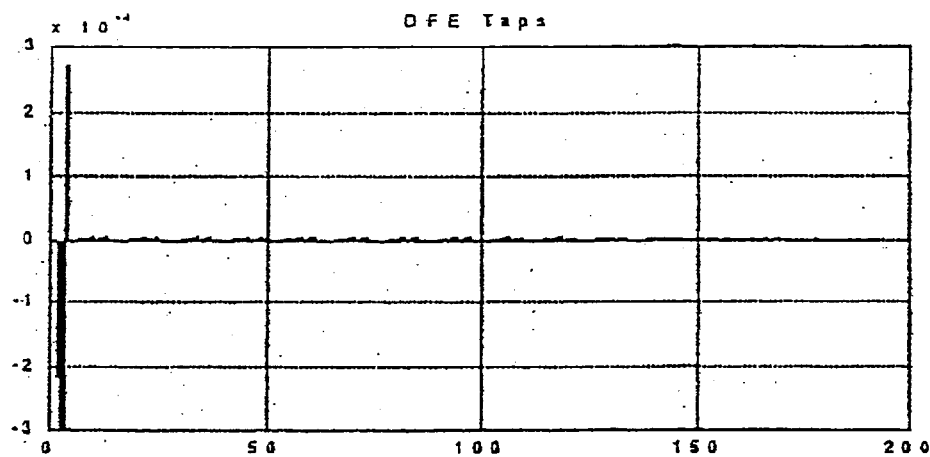
FIG. 6d

Figure 8a
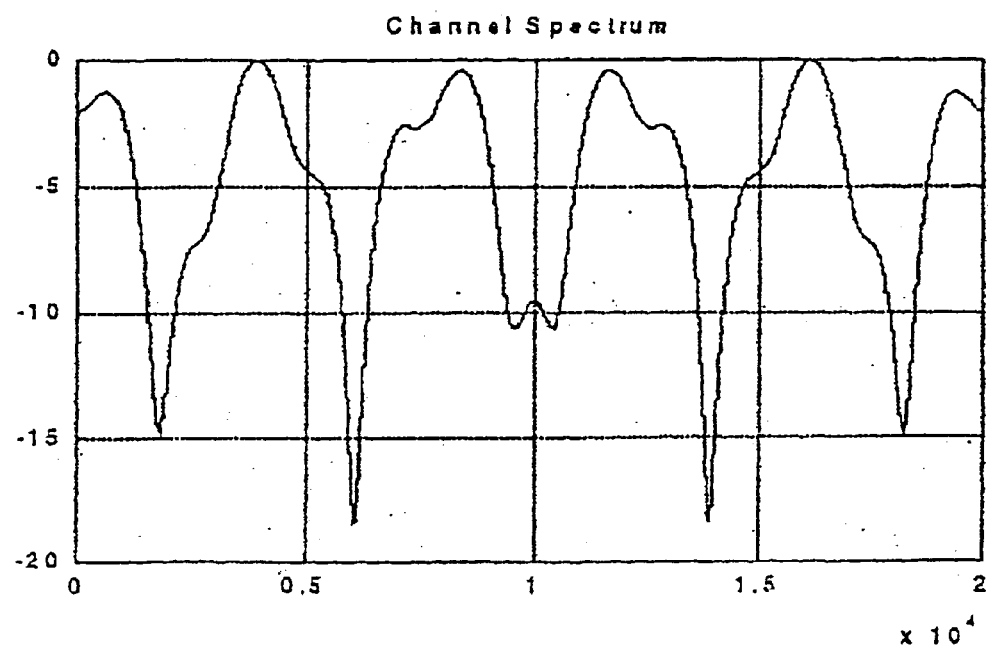
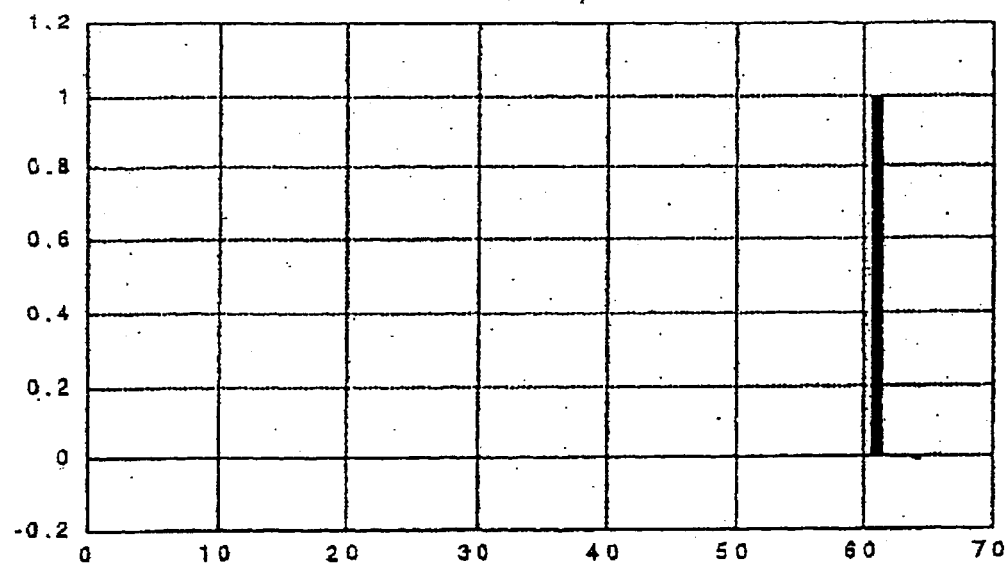
Figure 8b

FIG. 8c
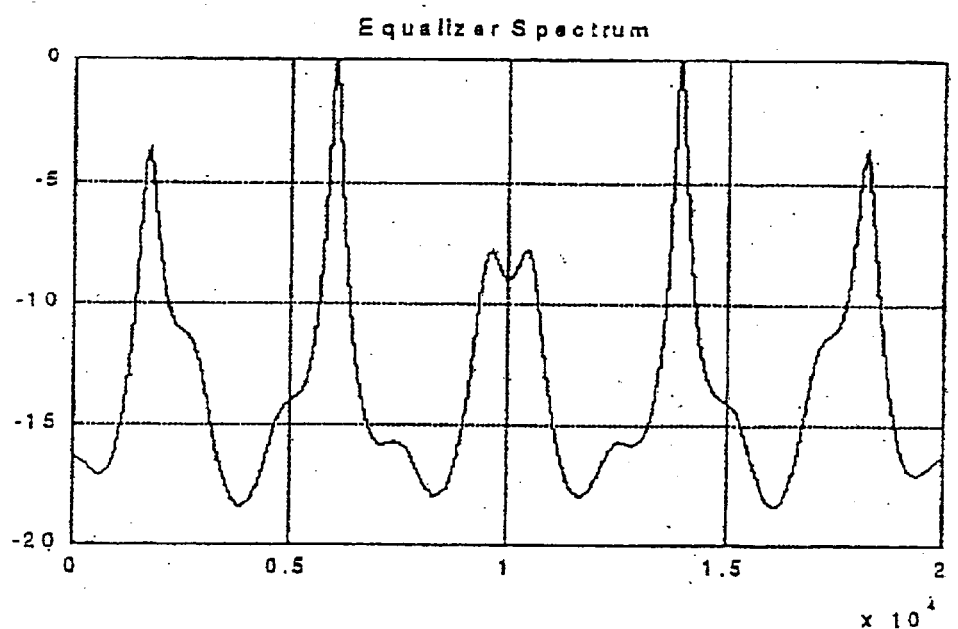
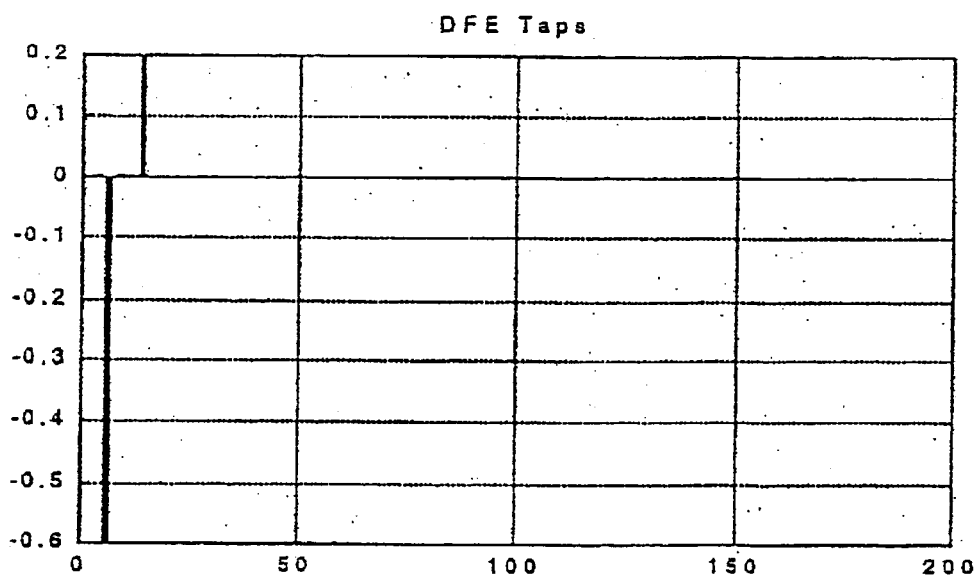
FIG. 8d

METHOD FOR EQUALIZING A VSB HIGH DEFINITION TELEVISION SIGNAL IN THE PRESENCE OF CO-CHANNEL INTERFERENCE

CROSS-REFERENCE TO RELATED APPLICATIONS

This is a regular utility patent application which claims priority to U.S. provisional patent application Ser. No. 60/284,279, filed Apr. 16, 2001 and assigned to the same assignee as this application.

FIELD OF THE INVENTION

This invention relates to data transmission. It is disclosed in the context of a receiver for High-Definition Television (HDTV), for example, a receiver operating according to the Advanced. Television Systems Committee (ATSC) Vestigial Sideband (VSB) standard, but is believed to be useful in other applications as well.

BACKGROUND OF THE INVENTION

Various methods and apparatus for the reliable recovery of symbol streams from received signals are known. Generally, such methods and apparatus operate by demodulating the received signal, analog-to-digital converting the demodulated signal into an unequalized symbol stream, and equalizing the symbol stream in such a way that the symbols can reliably be mapped to particular points in a so-called symbol constellation. The equalized symbols are then decoded into bit groups, for example, bit pairs, quartets, sextets, octets, and so on, depending upon the complexity of the constellation.

In such methods and apparatus, the equalization process itself is typically adaptive. That is, the unequalized bit stream is input to a device or system which monitors its output symbol stream, and adapts its own transfer function to fit the points of its output symbol stream as closely as possible to points of the symbol constellation. Equalization is frequently conducted with the aid of a so-called Feed Forward Equalizer (FFE) or Feed Forward Filter (FFF) and a Decision Feedback Equalizer (DFE)or Decision Feedback Filter (DFF). In many circumstances, the adaptive equalization process is conducted in at least two phases, or operating modes. In one of these phases, sometimes conducted during initialization of the receiving equipment or when the receiving equipment, for example an HDTV receiver, tunes to another channel, the equalizer employs an algorithm, such as Godard's Constant Modulus Algorithm (CMA). See, for example, D. N. Godard, "Self-Recovering Equalization and Carrier Tracking in Two Dimensional Data Communication Systems", IEEE Transactions on Communications, Vol. COM-28, pp. 1867–1875, November 1980. Then, after initial convergence, the equalization process enters another phase is which the equalizer transfer function is continuously adapted using another algorithm, such as a decision-directed algorithm, to keep the decoded symbols within a close range of the points on the symbol constellation. The first of these phases is sometimes called a blind phase, the second a decision-directed phase. Methods and apparatus of these types are well known.

SUMMARY OF THE INVENTION

According to the principles of the invention, apparatus for equalizing a signal includes an equalizer having first and second filters. The signal is initially equalized with the first filter during a blind operating mode, and is subsequently equalized with the second filter during a decision-directed operating mode. A predetermined tap of the second filter is set to a zero value during the blind equalizing mode.

In a preferred embodiment, a filter for rejecting NTSC co-channel interference is inserted ahead of the equalizer when co-channel interference is present.

BRIEF DESCRIPTION OF THE DRAWINGS

The invention may best be understood by referring to the following detailed description and accompanying drawings. In the drawings:

FIGS. 3a–e, 4a–e, 5a–e, 6a–e, 7a–e and 8a–e illustrate comparative results of tests conducted with the prior art and with the invention.

DETAILED DESCRIPTIONS OF ILLUSTRATIVE EMBODIMENTS

In the ATSC VSB transmission system adopted for high definition television in the United States, when strong co-channel NTSC interference is detected, a comb filter 20 is switched in before the equalizer 22 in a receiver. The comb filter 20, which has a transfer function of $H_c(z)=1-z^{-12}$, attenuates the co-channel NTSC interference (picture and sound carriers). The new channel that the equalizer 22 sees is now the original channel convolved with the comb filter 20. When the comb filter 20 is placed before the equalizer 22 and the equalizer 22 taps c(n), n=0, 1, 2, . . . are adapted using the CMA, the equalizer 22 produces an eight level output. In effect, it equalizes both the channel and the comb filter 20 which precedes equalizer 22. It is desirable for the equalizer 22 to produce a fifteen level output by equalizing only the channel and not the comb filter 20. The disclosed system in accordance with the present invention achieves this result.

Figure 1:
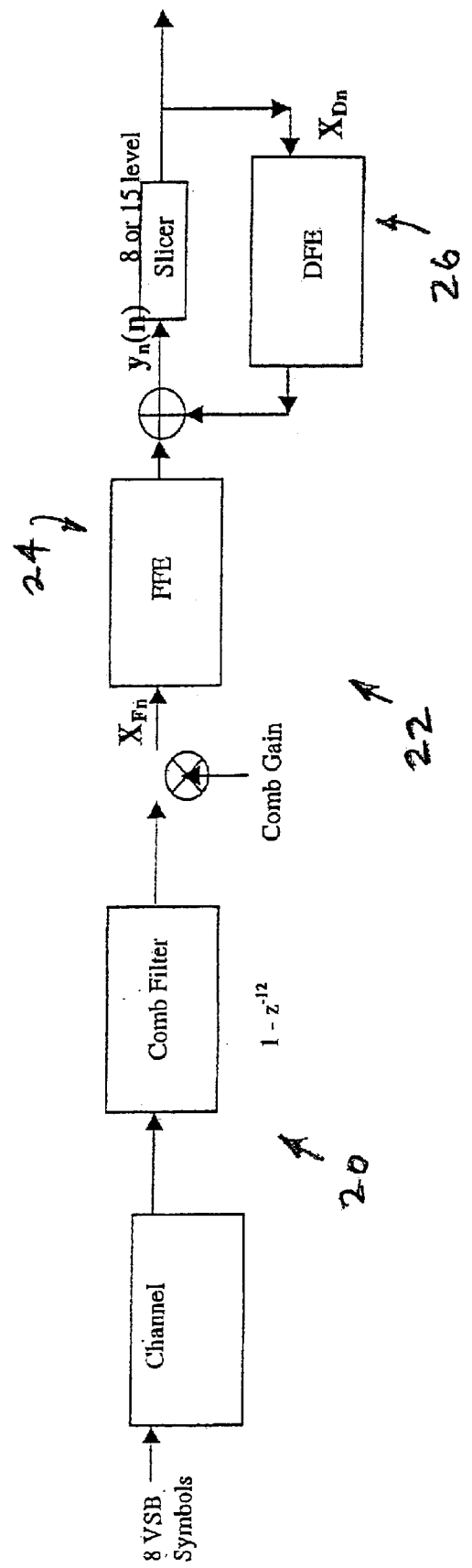
FIGS. 1 and 2 illustrate block diagrams useful in understanding the invention.
Figure 2:
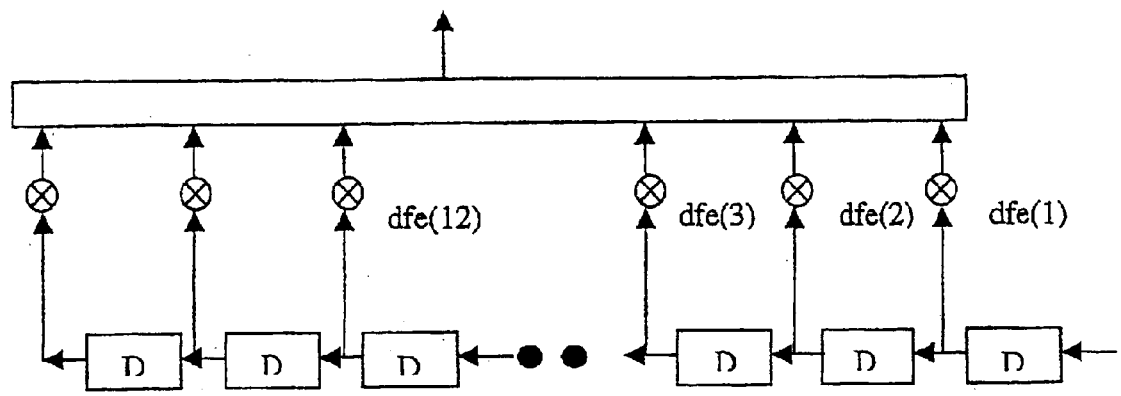
Figure 3A:
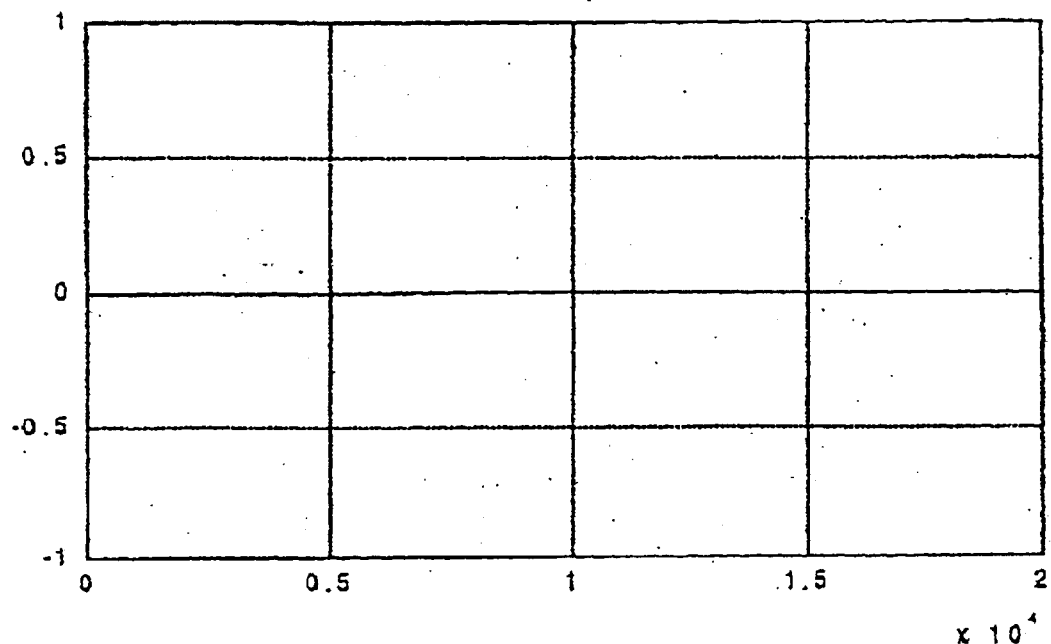
Figure 3B:
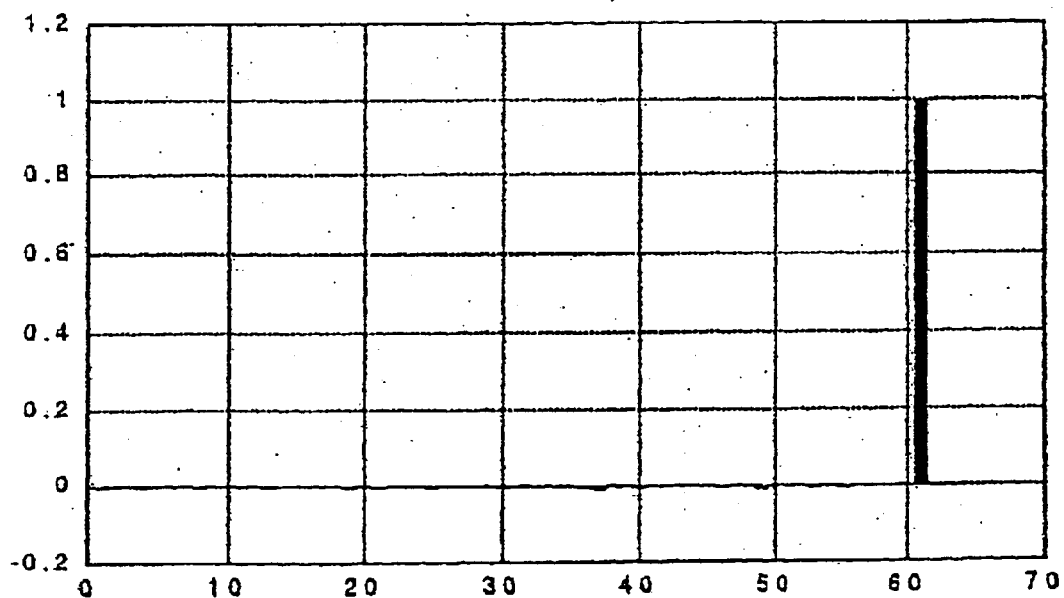
Figure 3E:
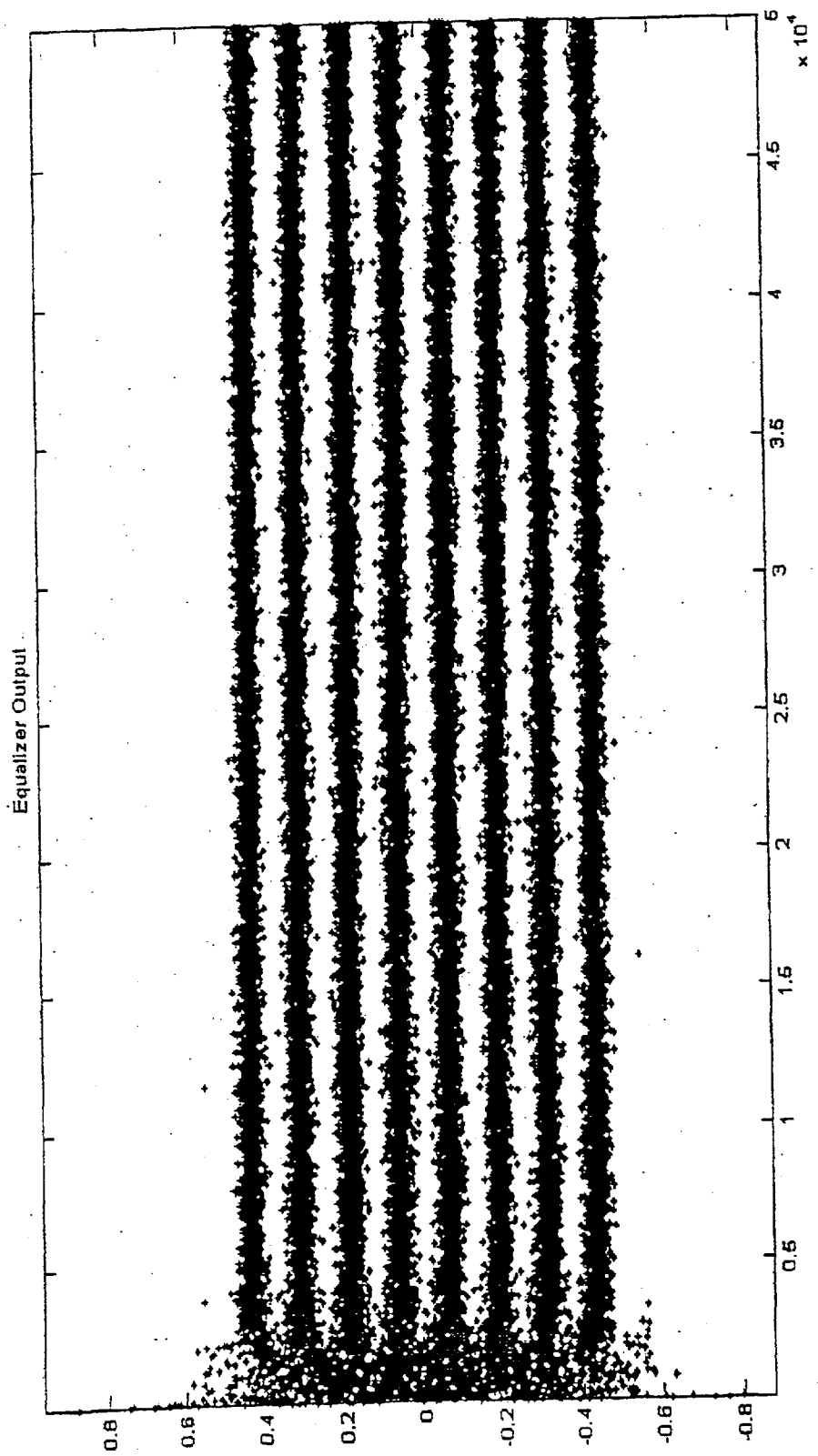
Figure 4A:
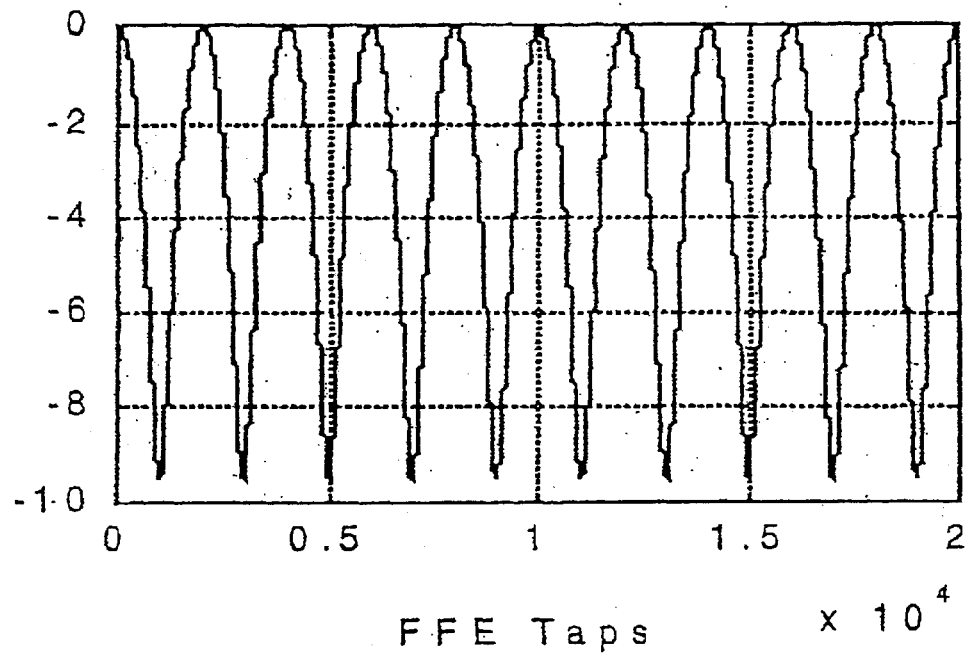
Figure 4B:
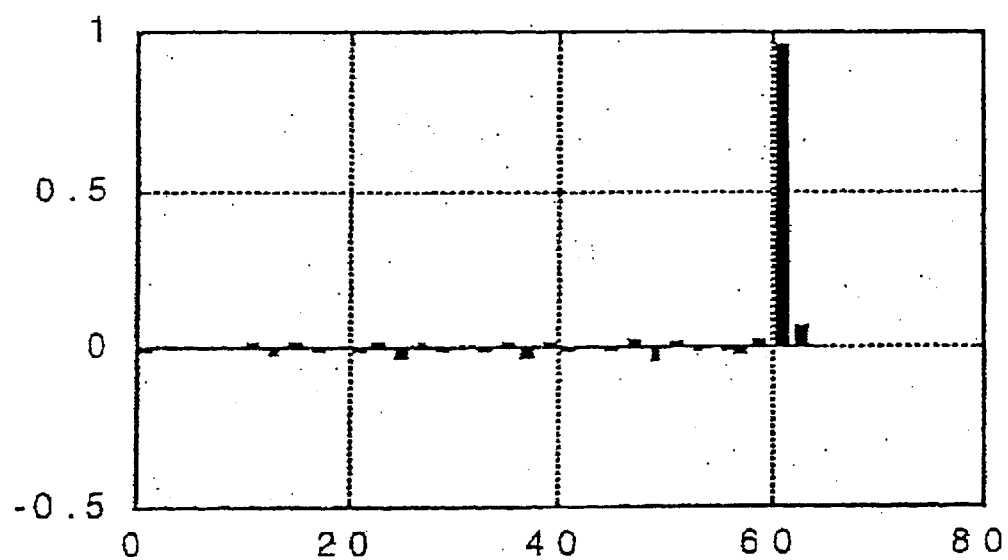
Figure 4E:
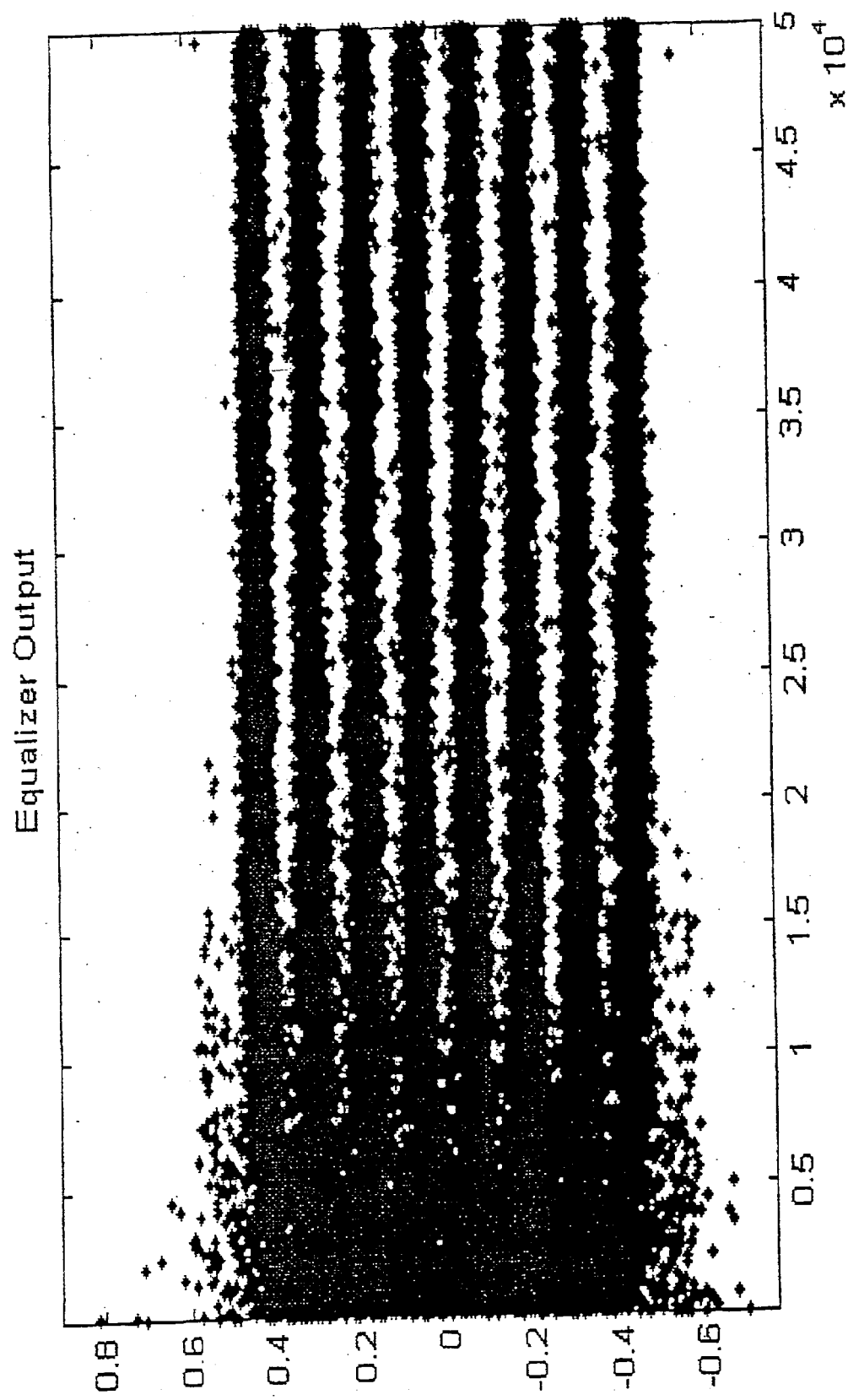
Figure 5A:
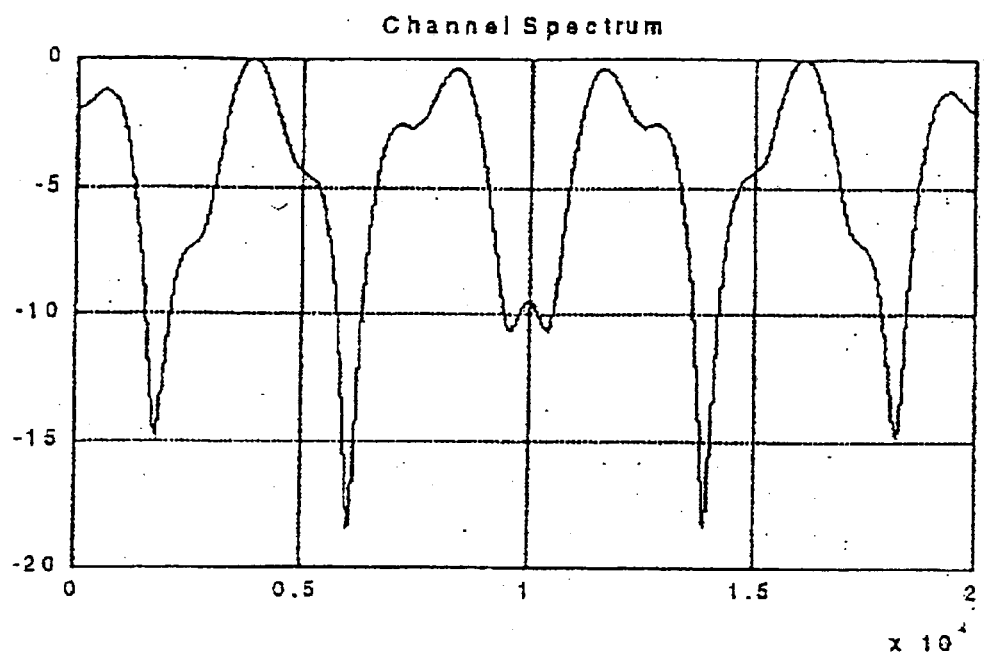
Figure 5B:
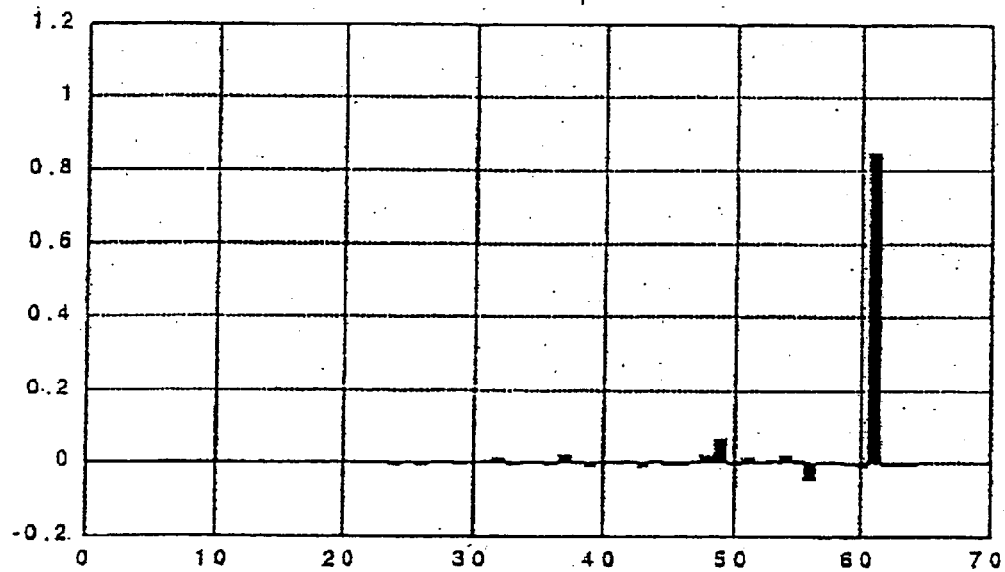
Figure 5C:
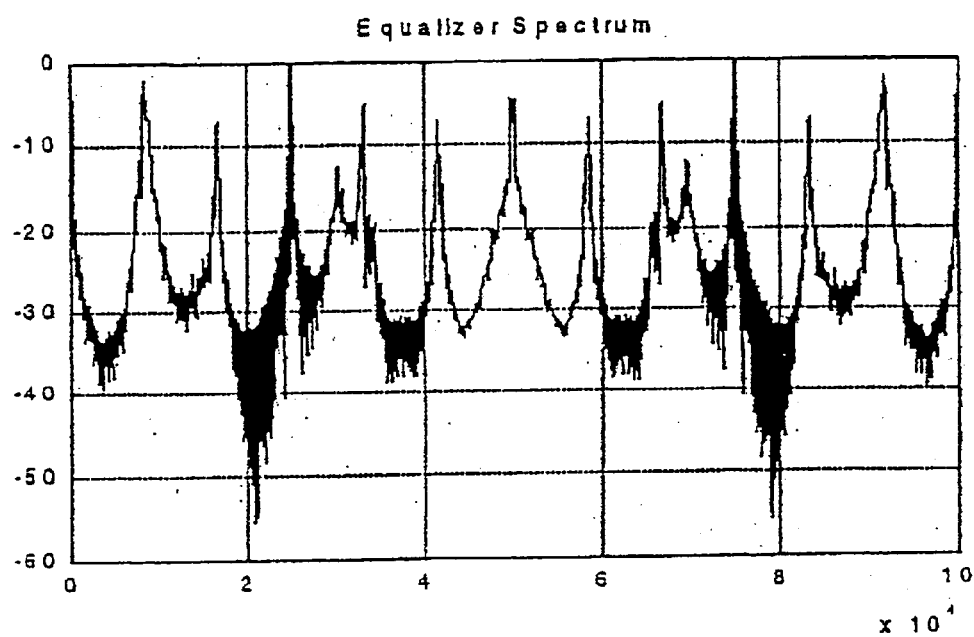
Figure 5D:
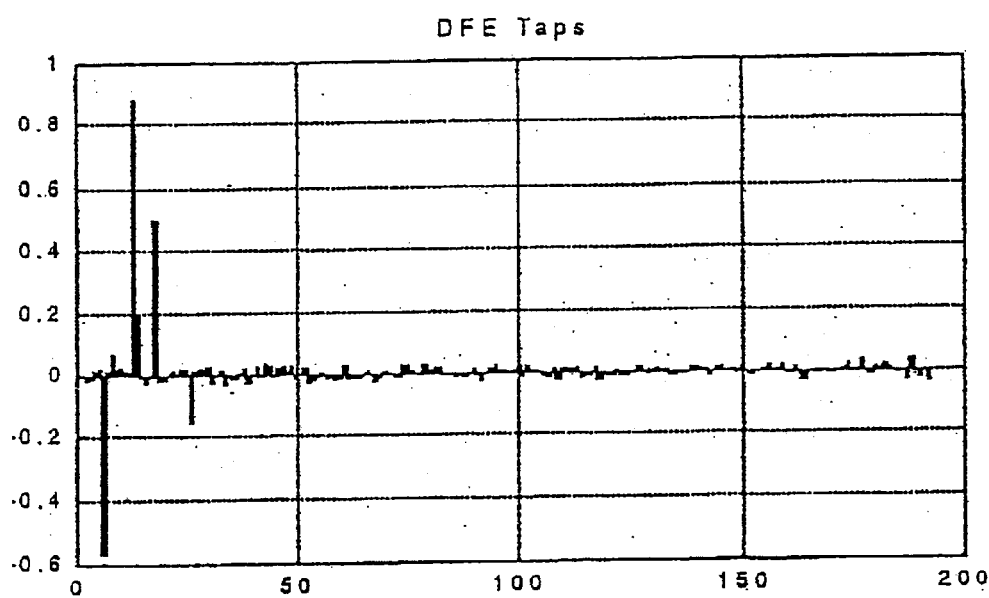
Figure 5E:
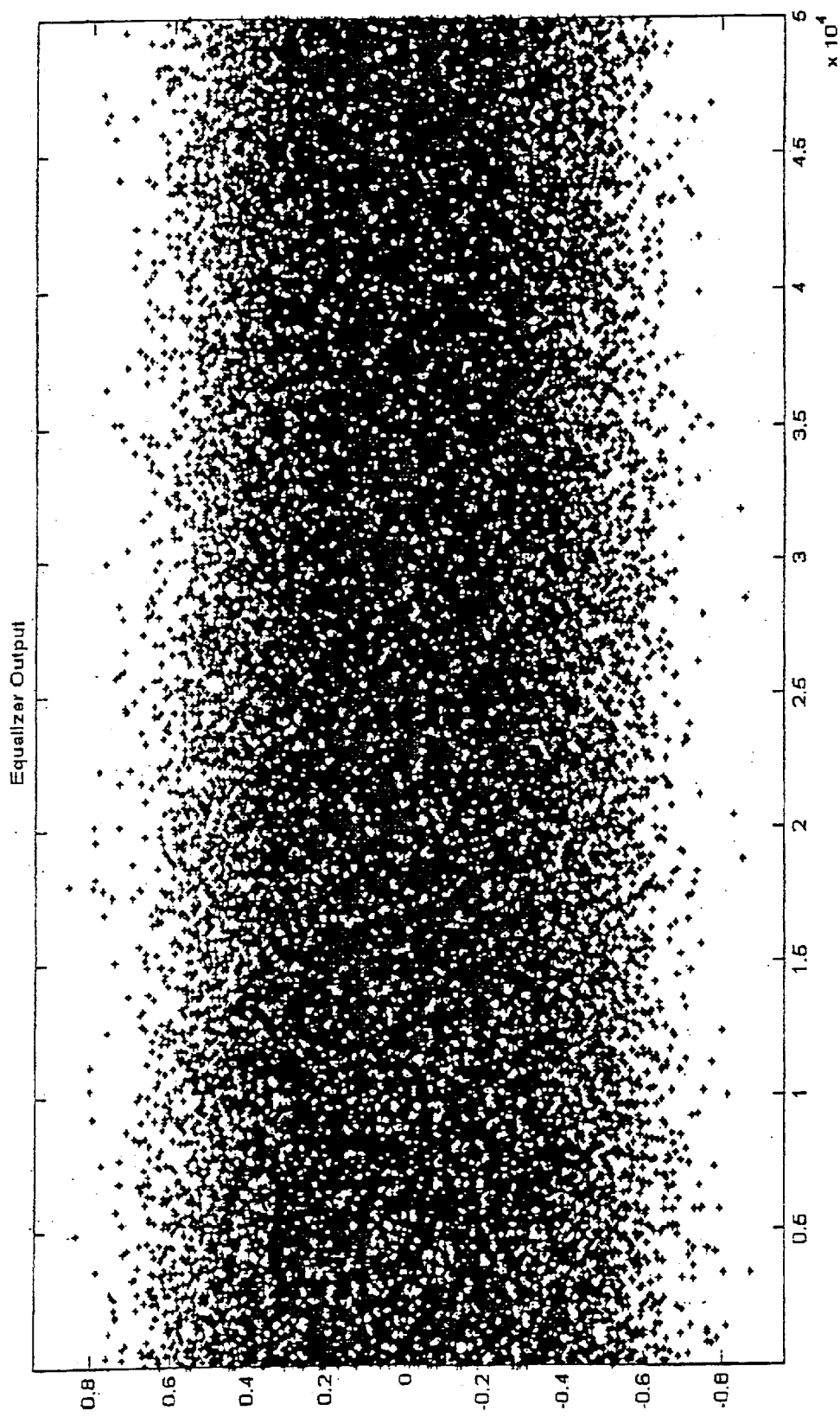
Figure 6E:
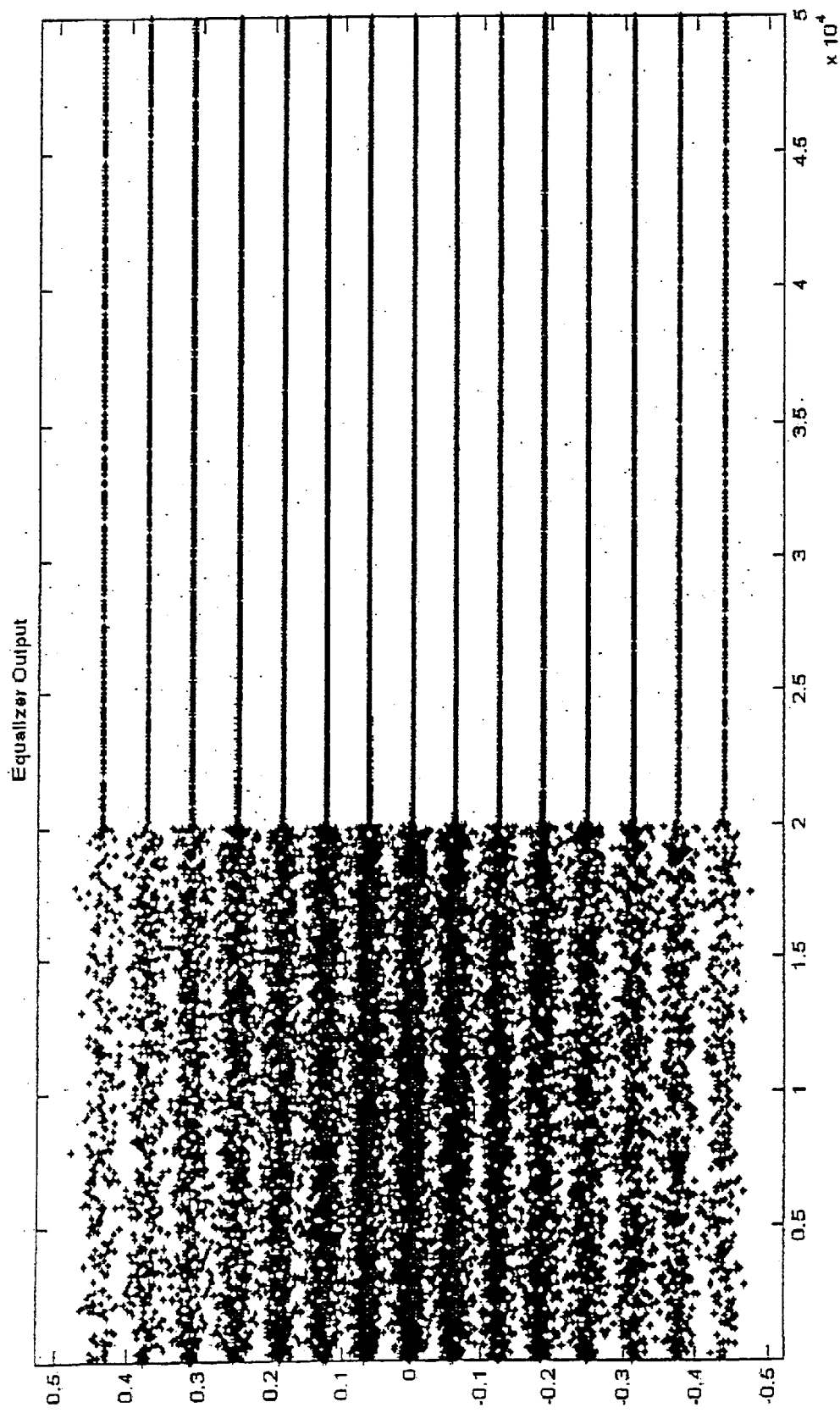
Figure 7A:
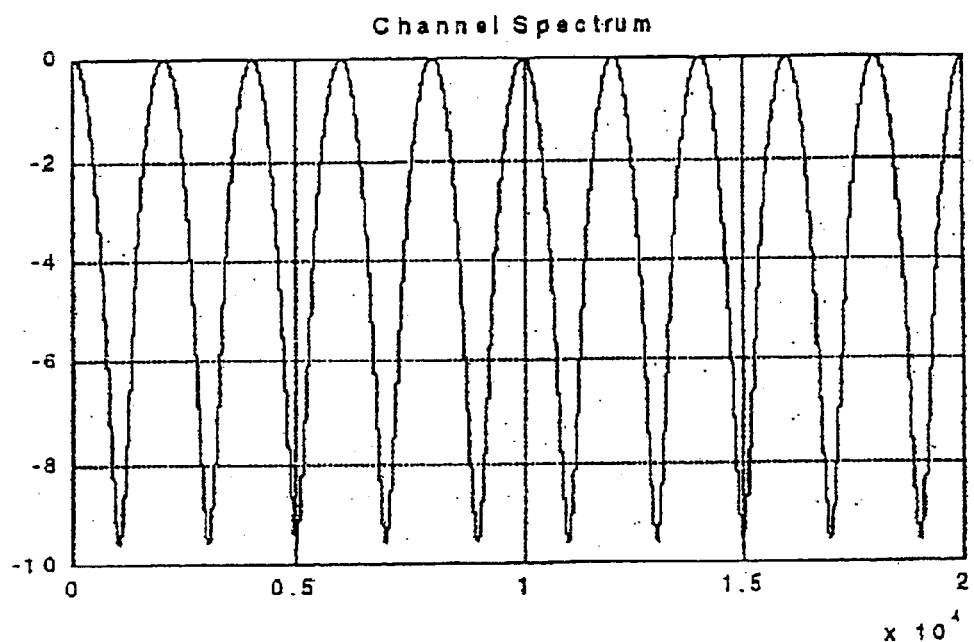
Figure 7B:
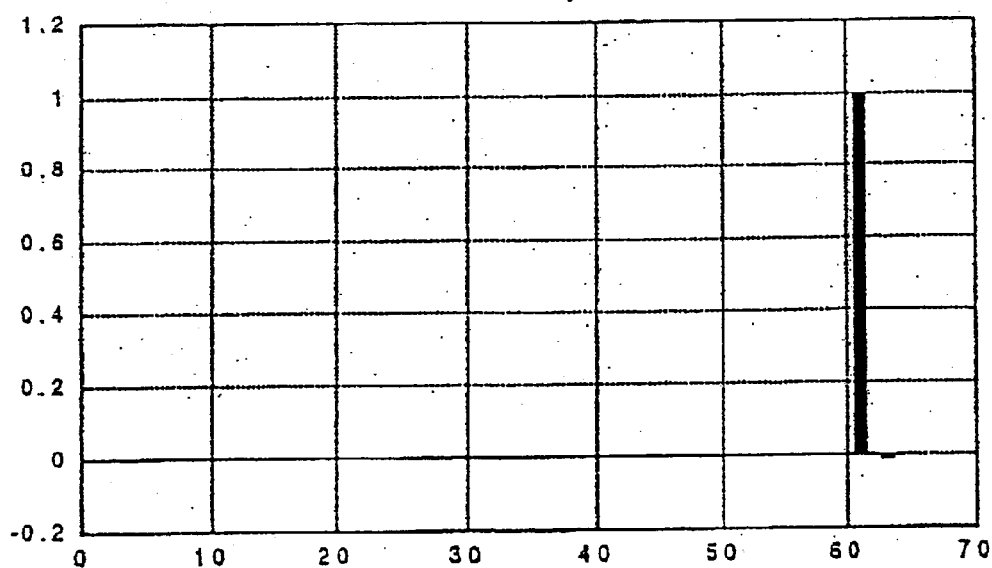
Figure 7C:
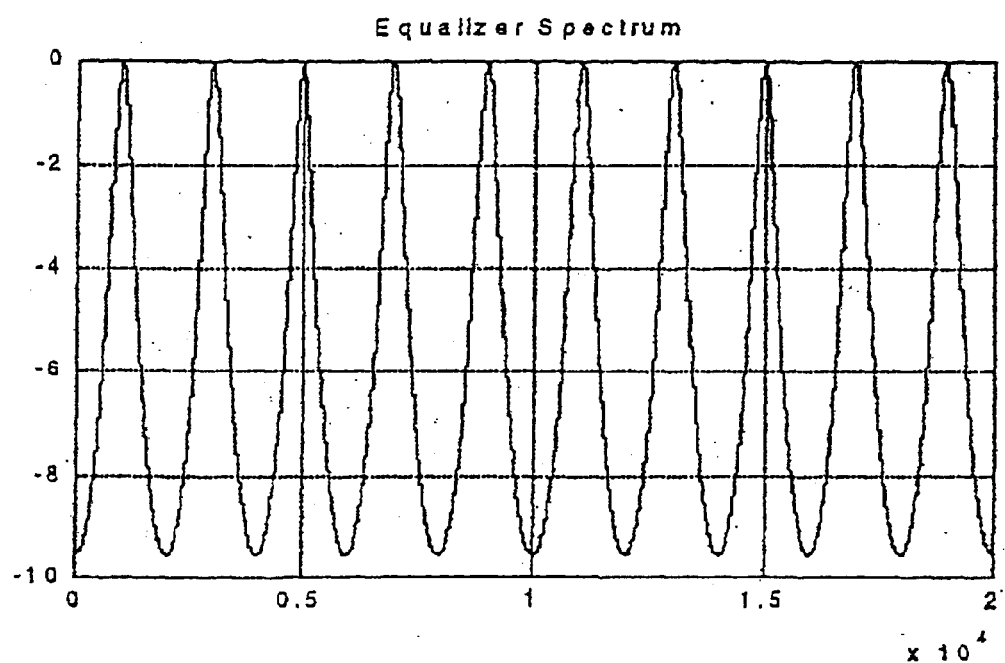
Figure 7D:
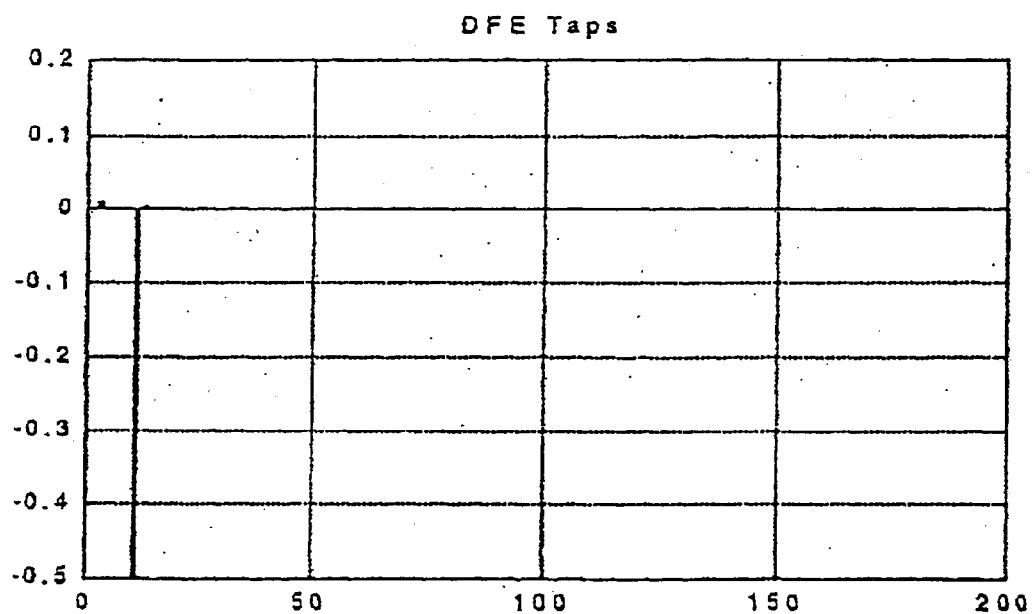
Figure 7E:
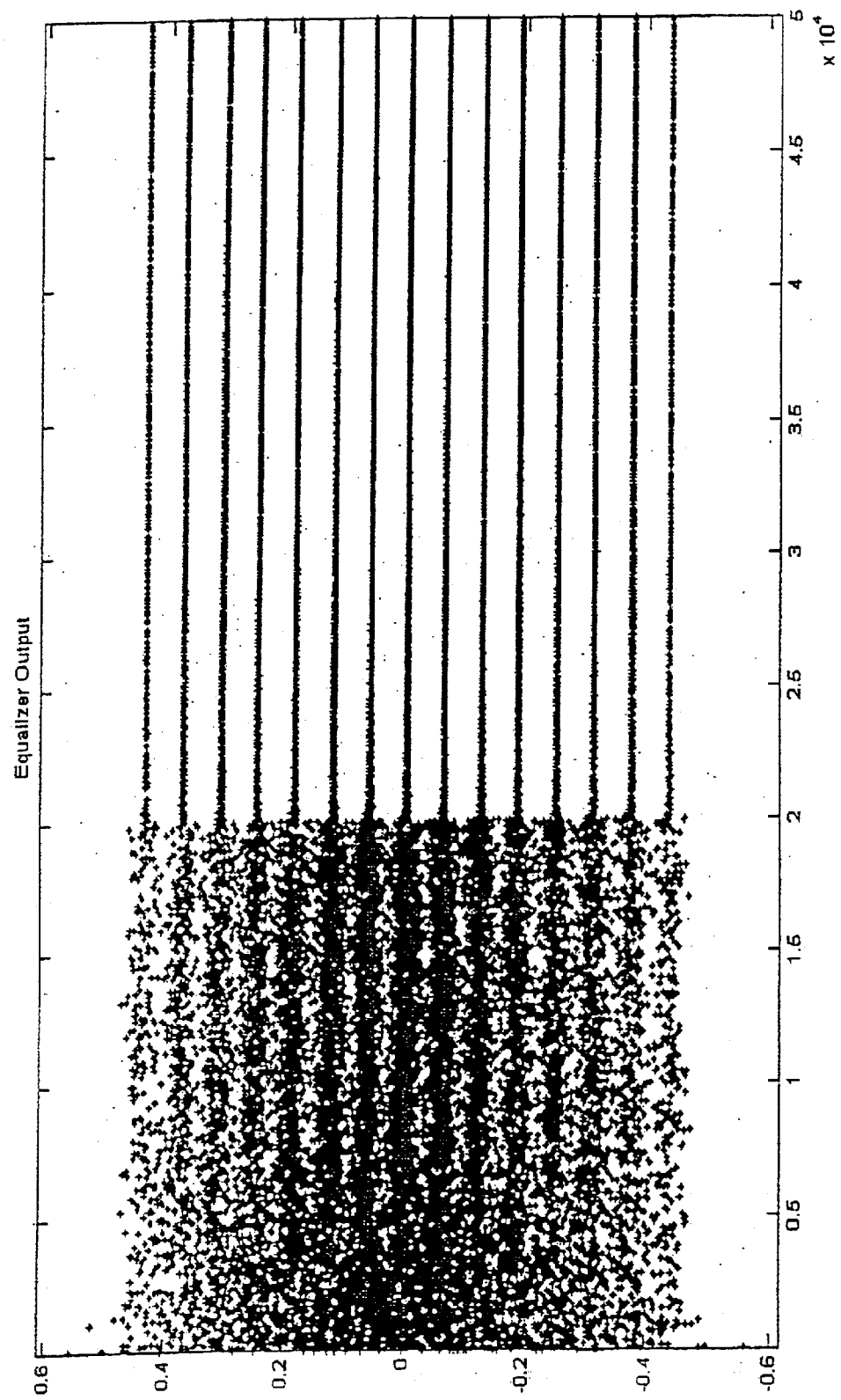
Figure 8E:
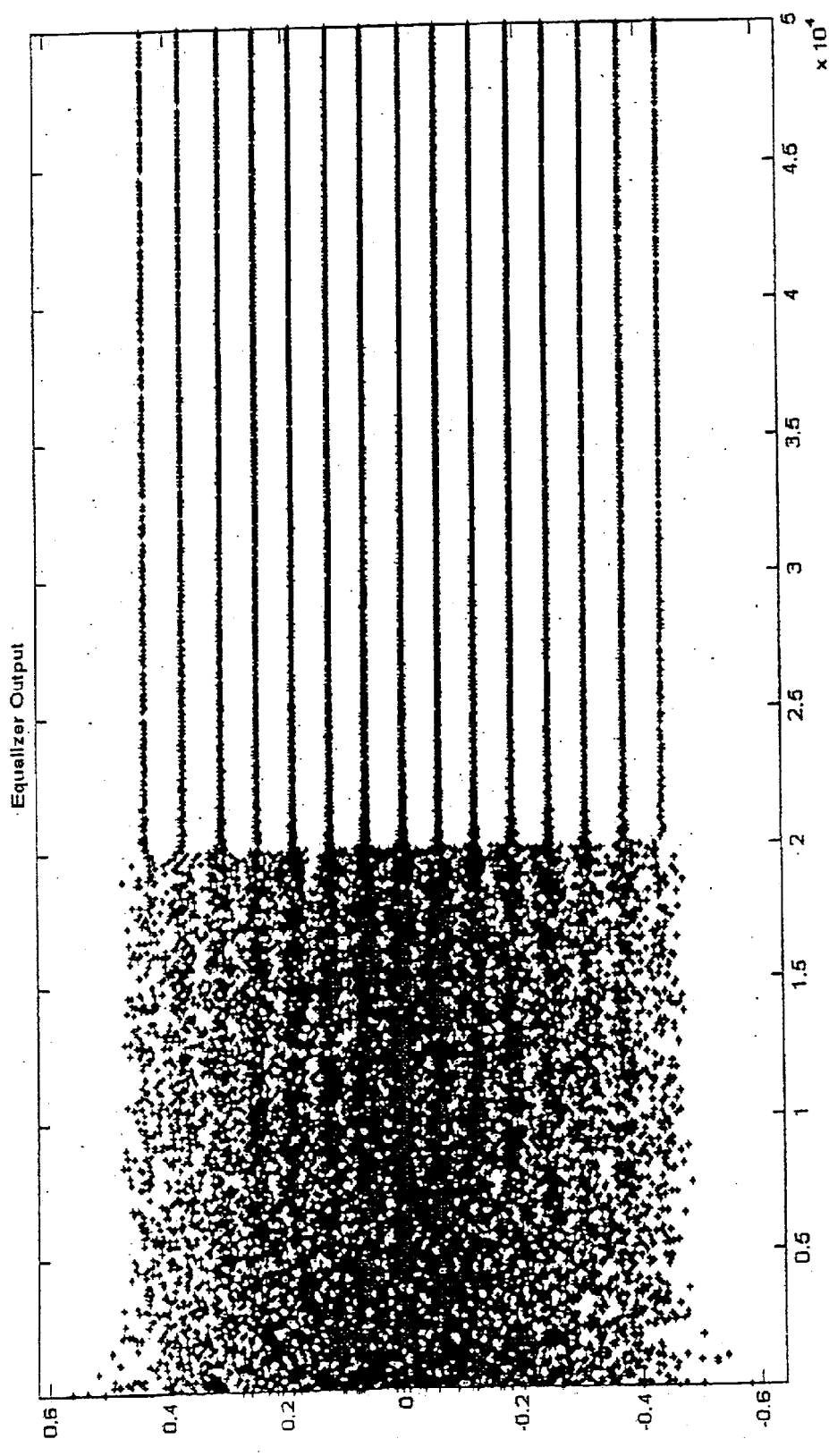

In FIG. 1, a receiver responsive to a high definition television signal compatible with the ATSC 8-VSB high definition television standard uses an adaptive equalizer 22 to equalize channel amplitude and phase distortion. The equalizer 22 structure that is commonly used comprises an FFE 24 that is used in conjunction with a DFE 26.The FFE section 24 is used to equalize preghosts and channel zeroes that fall outside the unit circle. The DFE section 26 is used to equalize post-ghosts. FFE 24/DFE 26 structures are illustrated in block form in FIGS. 1 and 2.

A technique that is commonly used to train the equalizer 22 uses blind equalization until the equalizer 22 has reached a certain degree of convergence, and then switches to decision-directed equalization. The most common form of blind equalization that is used employs the CMA algorithm. Using the CMA, the FFE 24 and DFE 26 coefficients are updated using the following equations:

$$C_{n+1}=C_n+a_F*e(n)*X_{Fn} \qquad \text{(FFE Update)}$$

$$D_{n+1}=D_n+a_D*e(n)*X_{Dn} \qquad \text{(DFE Update)}$$

where: $C_n$=FFE 24 coefficient vector, $D_n$=DFE 26 coefficient vector, $X_{Fn}$=data vector into the FFE 24, $X_{Dn}$=data vector into the DFE 26, and e(n)=blind equalization error.

The blind equalization error is calculated as follows:

$$e(n)=y_0(n)*(|y_0(n)|^2-R^2)$$

where:

$y_0(n)$=equalizer output (FFE 24+DFE 26 output)

$R^2$=Ring Value squared $=E(s^4(n))/E(s^2(n))$ $E(\ )$=expectation of $(\ )$ $s(n)$=8 VSB constellation points.

When comb filter 20 is switched in and the equalizer 22 taps are updated using the conventional CMA algorithm described above, the equalizer 22 converges to a solution by which it equalizes the combination of the comb filter 20 and the transmission channel. The result is that an 8 level symbol constellation is produced at the equalizer 22 output. These results are illustrated in FIGS. 3*a–e*, 4*a–e* and 5*a–e* for three different ghost (multipath) cases. FIGS. 3*a–e* illustrate channel 1 results with dfe (12) adapting. The channel is $c(0)=1$. FIGS. 4*a–e* illustrate channel 2 results with dfe (12) adapting. The channel is $c(0)=1$, $c(10)=0.5$. FIGS. 5*a–e* illustrate channel 3 results with dfe (12) adapting. The channel is $c(0)=1$, $c(5)=0.6$, $c(13)=-0.2$. The parameters used in this example are set forth in Table 2. As can be seen, the equalizer 22 output is 8 level and the equalizer taps $c(n)$, $n=0, 1, 2, \ldots$ have equalized the combination of the comb filter 20 and 10 channel. Equalization of the comb filter 20 results in the twelfth DFE tap, dfe(12), being set to a value of 1.0.

$$H_{co}(z) = C(z)(1 - z^{-12})$$
$$= (1 + a_1 z^{-n1} + a_2 z^{-n2} + \ldots )(1 - z^{-12})$$
$$= (1 + a_1 z^{-n1} + a_2 z^{-n2} + Y) - z^{-12}(1 + a_1 z^{-n1} + a_2 z^{-n2} + \ldots )$$
$$= (1 + a_1 z^{-n1} + a_2 z^{-n2} + Y) +$$
$$(-z^{-12} - a_1 z^{-(n1+12)} + a_2 z^{-(n2+12)} + \ldots )$$

One property of this transfer function is that it contains the term: $-z^{-12}$. If the equalizer equalizes the channel plus comb filter combination, then the equalizer will equalize $H_{co}(z)$. In other words, the equalizer transfer function will be $H_e8(z)=1/H_{co}(z)$. The equalizer transfer function will contain the term $-z^{-12}$ in its denominator. When the equalizer is implemented using the FFE/DFE structure described earlier, the DFE will have a value of 1.0 at its tap number 12. That is, dfe(12)=1.0. This is a property of the 8 level solution.

It is noted that if the DFE output is added to the FFE output to get the combined equalizer output, then dfe(12) will converge to 1.0. If the DFE output is subtracted from the FFE output, then dfe(12) will converge to −1.0. It is assumed, in this case, that the two outputs are added. The same argument applies in the case of subtraction.

It is desirable for the equalizer to produce a 15 level solution by not equalizing the comb filter. Thus the equalizer should converge to the following solution:

$$H_e 15(z)=1/(1+a_1 z^{-n1}+a_2 z^{-n2}+\ldots )$$

TABLE 1

Channels and Their Corresponding Equalizer Solutions for 8 and 15 Level Outputs

| Channel Transfer Function, $H_c(z)$ | Channel + Comb Filter Transfer Function, $H_{co}(z)$ | Equalizer solution that produces an 8 level output, $1/H_{co}(z)$ | Desired equalizer solution (One that produces a 15 level output) |
| --- | --- | --- | --- |
| 1.0 | $1 - z^{-12}$ | $1/(1 - z^{-12})$ | 1.0 |
| $1 + 0.5 z^{-10}$ | $1 + 0.5 z^{-10} - z^{-12} - 0.5 z^{-22}$ | $1/(1 + 0.5 z^{-10} - z^{-12} - 0.5 z^{-22})$ | $1/1(1 + 0.5 z^{-10})$ |
| $1 + 0.6 z^{-5} - 0.2 z^{-13}$ | $1 + 0.6 z^{-5} - 0.2 z^{-13} - z^{-12} - 0.6 z^{-17} + 0.2 z^{-25}$ | $1/1 + 0.6 z^{-5} - 0.2 z^{-13} - z^{-12} - 0.6 z^{-17} + 0.2 z^{-25})$ | $1/(1 + 0.6 z^{-5} - 0.2 z^{-13})$ |

The proposed algorithm for enabling the equalizer 22 to equalize the channel only and not the comb filter 20 utilizes a property of the 8 and 15 level solutions to control the adaptation of the CMA. Consider two cases of the channel transfer function: (1) where the channel ghost value at location (symbol) 12 (hereinafter c(12)) is zero; and (2) where c(12) is large.

Case I: Channel Ghost Value at Location (Symbol) 12, c(12), is Zero.

In this case, the channel transfer function has the form:

$$C(z)=1+a_1 z^{-n1}+a_2 z^{-n2}+\ldots$$

where $n_1$, $n_2$, Y are not equal to 12.

The channel, cascaded with the comb filter, has the following transfer function:

where, again, $n_1$, $n_2$, are not equal to 12, under the assumption that the channel has no ghost at symbol number 12, that is, that c(12)=0. In this case dfe(12)=0. This is a property of the 15 level solution.

To summarize, the 8 level solution will result in dfe (12)=1.0. The 15 level solution will result in dfe (12)=0, under the assumption that c(12)=0. This difference between the 8 and 15 level solutions is adopted to control the adaptation of the CMA.

Since the 15 level solution requires dfe(12) to be 0, the adaptation is forced to converge to the 15 level solution, and not the 8 level solution, by setting dfe (12)=0 during CMA adaptation. Setting dfe (12)=0 during the adaptation can be accomplished in several ways. One is simply to initialize dfe (12) to zero and then not adapt it. Another way is to adapt it at every symbol but then reset it to zero. Further variations include adapting it at every symbol, but resetting it to zero every two or three or four symbols, since it will not significantly deviate from zero after a few updates.

Typically, in blind equalization mode, the CMA is run first and then a switch is made to decision-directed equalization after a certain degree of convergence is achieved. Once the switch is made, dfe(12) can be updated. Tap number 12 of the DFE will exhibit only a small value, due, for example, to line noise, adaptation noise, and the like, since the underlying assumption of this Case I was that the channel has no energy at symbol 12.

The results of setting dfe(12) to zero during CMA adaptation are illustrated in FIGS. 6a–e, 7a–e and 8a–e. Again, the parameters used for these examples are set forth in Table 2. FIGS. 6a–e illustrate channel 1 results with dfe (12) forced to zero. The channel is c(0)=1. FIGS. 7a–e illustrate channel 2 results with dfe (12) forced to zero. The channel is c(0)=1, c(10)=0.5. FIGS. 8a–e illustrate channel 3 results with dfe(12) forced to zero. The channel is c(0)=1, c(5)=0.6, c(13)=−0.2.

Case II: Channel Ghost Value at Location (Symbol) 12, c(12), is Non-Zero.

Now consider the case in which the channel has energy at symbol 12. The algorithm described previously in Case I works even when there is a ghost at symbol 12, c(12) not equal to zero. However, simulations have shown that the ghost at symbol 12 must be fairly small. Specifically, c(12) has to be approximately 17–20 dB below the main channel tap for the algorithm to work. In cases where c(12) is larger than this stated value, the algorithm will not converge the equalizer output error. However, it is expected that the probability of having large energy exactly at symbol 12 is fairly small.

Thus, setting dfe(12)=0 during CMA adaptation will result in the equalizer equalizing only the channel and producing a 15 level output.

TABLE 2

|  | 8 LEVEL CASE DFE adapting | 15 LEVEL CASE DFE (12) = 0 |
| --- | --- | --- |
| Constellation Points | −224, −160, −96, −32, 32, 96, 160, 224. (All divided by 512) | −224, −192, −160, −128, −96, −64, −32, 0, 32, 64, 96, 128, 160, 192, 224 (All divided by 512) |
| Ring Size | 0.380173 | 0.3125 |
| Blind Equalization (CMA) - number of symbols | 5 Million | 2 Million |
| Decision-Directed Equalization (DDE) - number of symbols | 0 | 3 Million |
| FFE Main Tap - Initial Value | 1.0 | 1.0 |
| Comb Filter Gain | 1.0 | 0.5 |
| FFE - Step Size | 0.001 | 0.001 |
| DFE - Step Size | 0.008 | 0.008 |

In summary, equalizer 22 can converge to either a 15-level output in the absence of comb filter 20, or to an 8-level output in the presence of the comb filter. The 15-level output is preferred, and is achieved in the presence of the comb filter by setting equalizer tap 12 to a value (magnitude) of 1 (unity) during the blind equalization process when the comb filter is present. Tap 12 is important because the comb filter causes tap 12 to take on a value of 1 when there is no ghost (multipath) at symbol 12 in the transmission channel. Thus the value of tap 12 determines whether an 8-level output or a 15-level output is provided. The comb filter affects tap 12 in a known manner when the channel has zero energy at tap 12. The way it affects other taps is not known because it is determined by channel mutltipath ("ghost") effects.

When the comb filter is inserted a 15-level output is required because the trellis decoder following the equalizer switches to a 15-level mode from an 8-level mode.

What is claimed is:

1. In a system for processing a signal containing video information received via a transmission channel, a channel equalizing method employing an equalizer with first and second filters, comprising the steps of:

(a) initially equalizing the received signal with said first filter during an initial blind operating mode;

(b) subsequently equalizing the received signal with said second filter during a decision-directed operating mode; and (c) setting a predetermined tap of said second filter to a zero value during said initial blind equalizing mode.

2. A method according to claim 1, wherein
    said first filter is a feed forward filter; and
    said second filter is a decision feedback filter.

3. A method according to claim 1, further including the step of
    inserting a filter for rejecting co-channel interference ahead of said equalizer when said interference is present.

4. A method according to claim 3, wherein
    said inserted filter is a comb filter.

5. A method according to claim 1, wherein
    said predetermined tap is the 12th tap.

6. A method according to claim 1, wherein
    in step (c) said tap is set to a zero value and is not adapted during said blind mode.

7. A method according to claim 1, wherein
    in said step (c) said tap is adapted at every signal symbol but then reset to a zero value.

8. A method according to claim 1, wherein
    in said step (c) said tap is adapted at every symbol, but reset to a zero value after every few symbols.

9. A method according to claim 1, wherein
    said video information is high definition television (HDTV) information compatible with the ATSC HDTV standard.

10. In a video signal processing system, apparatus comprising
    a comb filter for rejecting co-channel interference; and
    a channel equalizer responsive to an output signal from said comb filter, having a first filter operative during an initial blind equalizing mode and a second filter operative during a subsequent decision-directed operating mode, wherein
    a predetermined tap of said second filter is set to a zero value during said blind equalizing mode.

11. Apparatus according to claim 10, wherein
    said first filter is a feed forward filter; and
    said second filter is a decision feedback filter.

12. Apparatus according to claim 10 wherein
    said video signal contains high definition television (HDTV) information compatible with the ATSC HDTV standard.

13. Apparatus according to claim 10, wherein
    said predetermined tap is the 12th tap.

* * * * *